United States Patent
Wilms

(10) Patent No.: US 10,972,807 B2
(45) Date of Patent: Apr. 6, 2021

(54) DYNAMIC WATERMARKING OF DIGITAL MEDIA CONTENT AT POINT OF TRANSMISSION

(71) Applicant: Deluxe One LLC, Burbank, CA (US)

(72) Inventor: Konstantin Reimund Wilms, Coto de Caza, CA (US)

(73) Assignee: DELUXE ONE LLC, Burbank, CA (US)

( * ) Notice: Subject to any disclaimer, the term of this patent is extended or adjusted under 35 U.S.C. 154(b) by 0 days.

(21) Appl. No.: 16/378,187

(22) Filed: Apr. 8, 2019

(65) Prior Publication Data

US 2019/0313161 A1 Oct. 10, 2019

Related U.S. Application Data

(60) Provisional application No. 62/654,211, filed on Apr. 6, 2018.

(51) Int. Cl.
 *H04N 21/8358* (2011.01)
 *H04N 21/845* (2011.01)
 (Continued)

(52) U.S. Cl.
 CPC ....... *H04N 21/8358* (2013.01); *H04L 9/0643* (2013.01); *H04N 19/114* (2014.11); *H04N 19/467* (2014.11); *H04N 21/8456* (2013.01)

(58) Field of Classification Search
 CPC .......... H04N 21/8358; H04N 21/8456; H04N 19/114; H04N 19/467; H04L 9/0643; G06F 17/30038; G06F 17/30864
 (Continued)

(56) References Cited

U.S. PATENT DOCUMENTS 7,366,909 B2   4/2008 Zhou et al.
7,603,559 B2  10/2009 Roberts et al.
(Continued)

FOREIGN PATENT DOCUMENTS

CA   2774923 A1   3/2011
CN   1507279 A    6/2004
(Continued)

OTHER PUBLICATIONS

"Introducing SafeStream 2.0 On-demand watermarking. Real-time video security,"https://www.safestream.com, accessed Jul. 1, 2019, 6 pages.

(Continued)

*Primary Examiner* — Thai Q Tran
*Assistant Examiner* — Sunghyoun Park
(74) *Attorney, Agent, or Firm* — Dorsey & Whitney LLP

(57) ABSTRACT

Multimedia content, such as film or video, is streamed to a plurality of users with a unique watermark embedded for each user. The content is provided through asynchronous multicast transmission. Users may request the content at different times and receive a uniquely watermarked stream of the content upon request as a discrete, just-in-time transmission. Content is watermarked upon a request for the content by a user. In several embodiments, each user is associated with a unique user identifier that becomes associated with a unique watermark. Once a watermark is associated with a user, the association is stored so that the same unique watermark may be used for future content requested by the user.

26 Claims, 5 Drawing Sheets

(51) Int. Cl.
*H04L 9/06* (2006.01)
*H04N 19/114* (2014.01)
*H04N 19/467* (2014.01)

(58) Field of Classification Search
USPC .......................................................... 386/260
See application file for complete search history.

(56) References Cited

U.S. PATENT DOCUMENTS

| | | | |
|---|---|---|---|
| 8,565,472 | B2 | 10/2013 | Rzeszewski et al. |
| 8,923,549 | B2 | 12/2014 | Kim et al. |
| 9,066,157 | B2 | 6/2015 | Jin et al. |
| 9,118,738 | B2 | 8/2015 | Archer et al. |
| 9,426,502 | B2 | 8/2016 | Perry |
| 9,697,217 | B1 | 7/2017 | Salyers et al. |
| 2002/0168082 | A1 | 11/2002 | Razdan |
| 2005/0044045 | A1* | 2/2005 | Pelly ............... G11B 20/00173 705/51 |
| 2005/0105763 | A1 | 5/2005 | Lee et al. |
| 2005/0193205 | A1 | 9/2005 | Jacobs et al. |
| 2005/0265576 | A1 | 12/2005 | Seong et al. |
| 2007/0110237 | A1* | 5/2007 | Tehranchi .......... H04N 1/32272 380/201 |
| 2009/0161909 | A1 | 6/2009 | Chow et al. |
| 2014/0325550 | A1 | 10/2014 | Winograd et al. |
| 2016/0328398 | A1* | 11/2016 | Adams .................... G06F 21/16 |
| 2017/0180822 | A1 | 6/2017 | Pradel et al. |

FOREIGN PATENT DOCUMENTS

| | | |
|---|---|---|
| CN | 101860743 B | 2/2012 |
| CN | 101325702 B | 6/2012 |
| CN | 102307320 B | 7/2013 |
| CN | 102438151 B | 7/2013 |
| CN | 105848009 A | 8/2016 |
| CN | 103731759 B | 3/2017 |
| CN | 106911936 A | 6/2017 |
| EP | 1437897 A2 | 7/2004 |
| EP | 3179438 A1 | 6/2017 |
| JP | 2008118606 A | 5/2008 |

OTHER PUBLICATIONS

Indee, "Secure screening rooms for your films and shows," Secure Watermarked Online Screeners, accessed https://indee.tv/ on Jul. 1, 2019, 5 pages.
Collberg et al., "Software Watermarking: Models and Dynamic Embeddings," Department of Computer Science, The University of Auckland, Auckland, New Zealand, pp. 311-324, https:www2.ucs.arizona.edu/~collberg/content/resea4ch/papers/collberg99software.
IR.DETO, "TraceMark™ Watermarking," www.irdeto.com, presentation, 2017, 41 pages.
Jarnikov et al., "A Watermarking System for Adaptive Streaming", 2014 IEEE International Conference on Consumer Electronics (ICCE), pp. 375-377.
International Search Report and Written Opinion dated Jul. 24, 2019, in PCT Application No. PCT/US2019/026385, 20 pages.

\* cited by examiner

DYNAMIC WATERMARKING OF DIGITAL MEDIA CONTENT AT POINT OF TRANSMISSION

CROSS REFERENCE TO RELATED APPLICATIONS

This application claims the benefit of priority pursuant to 35 U.S.C. § 119(e) of U.S. Provisional Application No. 62/654,211 filed 6 Apr. 2018 and entitled "Dynamic watermarking of digital media content at point of transmission," which is hereby incorporated herein by reference in its entirety.

TECHNICAL FIELD

The technology described herein relates to systems, devices, methods, and processes for digital watermarking. More specifically, the present disclosure relates to dynamically watermarking streaming digital content.

BACKGROUND

Digital exchange of multimedia content over the internet has become increasingly popular. For example, multimedia content may be streamed or downloaded by a user from a content provider. Streaming provides a constant flow and presentation of digital content to a user, allowing a user to play or use a digital media file while it is being delivered. Downloading digital content requires a user to first obtain an entire digital media file before using it.

Different processing steps may be necessary before media is ready to be streamed or downloaded. For example, encoding converts a media file for transmission, while transcoding converts a media file into a different format of similar or like quality to achieve compatibility with a different program or application. Content may be stored in multiple formats to be delivered via a content delivery network (CDN). Alternatively, just-in-time (JIT) packaging may be used and content may be converted into the user's format when it is requested.

Many different streaming formats exist that are based on standard HTTP protocols. Two exemplary and widely supported are HTTP Live Streaming (HLS, developed by Apple) and Dynamic Adaptive Streaming over HTTP (DASH), which are both based on standard HTTP protocols and are used for delivery using a content delivery network.

With advances in the internet, it has become increasingly easy to gain access to digital content. Some digital content may be restricted or confidential. For example, the content may be copyrighted, requiring a license to use it, or it may be pre-released content intended for internal circulation within a production company. With easier access over the internet, such restricted or confidential content may be illegally obtained and distributed. Therefore, most streaming content requires some level of security to ensure that access to such content is restricted to certain users.

Digital watermarking, also known as forensic watermarking, may be used for a variety of content identification, notification, piracy prevention and other purposes. Digital watermarking is a process of embedding copyright and/or other identifying information (such as a sequence of characters, numbers, or other code) in multimedia data such as songs, videos, graphics, publications and the like. While some digital watermarks are visible, most are often undetectable by a person's naked eye. In some applications, digital watermarks may be repeated at random locations within the content to make them more difficult to detect and remove. Forensics experts are able to use unique watermarks to track down copies of media content illegally leaked online. A unique watermark may enable such experts to track the illegal activity back to the initial culprit.

Current digital watermarking of online media content requires great storage capacity. In current practices, multiple copies of media content are encoded with unique watermarks and stored for later retrieval upon a user request to stream or download the media content. Because many users may stream or download the same content, and it is important to provide each user with content containing a unique watermark, many watermarked copies must be stored so that they are available upon request. In addition, modern watermarking approaches that seek to watermark digital content in real time require great computation capacity. Often, this approach is not scalable from a cost perspective and is only practical for limited audiences.

There is a need for a media delivery system that is capable of delivering watermarked copies of media content without the need to store multiple watermarked copies in advance, that can support immediate delivery of watermarked content without delay and infrastructure dependency, and that is scalable to millions of users.

The information included in this Background section of the specification, including any references cited herein and any description or discussion thereof, is included for technical reference purposes only and is not to be regarded subject matter by which the scope of the invention as defined in the claims is to be bound.

SUMMARY

In the system disclosed herein, multimedia content, such as film or video, is streamed to a plurality of users with a unique watermark embedded in the content specific to each user. The content is provided through asynchronous multicast transmission. Users may request the content at different times and receive a uniquely watermarked stream of the content upon request as a discrete, just-in-time transmission. Content is watermarked upon a request for the content by a user rather than watermarked in advance and stored in anticipation of requests. In several embodiments, each user is associated with a unique user identifier that becomes associated with a unique watermark. Once a watermark is associated with a user, the association is stored so that the same unique watermark may be used for future content requested by the user.

In one exemplary implementation, a computer-implemented dynamic watermarking system includes a storage device and one or more processors to prepare and provide watermarked content. The storage device is configured to ingest and store media content thereon. The processors are configured with instructions to perform the following functions: generate a first media file copy of the media content; partition the first media file copy into a first plurality of sequential segments each having respective segment lengths; and encode distinct watermarks into each of the sequential segments of the first media file copy. The processors are further configured to generate a second media file copy of the media content; partition the second media file copy into a second plurality of sequential segments corresponding in number to the first plurality of sequential segments and each having respective segment lengths, wherein the segment lengths of each of the second plurality of sequential segments are identical segment lengths to the segment lengths of corresponding segments the first plurality of sequential segments in sequence; and encode distinct watermarks into each of the sequential segments of the second media file copy. The processors are further configured to store the first and second media file copies on the storage device. The processors may receive a user request for transmission of the media file and, upon receipt, determine an identification of the user, map a unique permutation of the media content by identifying a first subset of the first plurality of sequential segments with watermarks and a second subset of the second plurality of sequential segments with different watermarks to be combined in sequence, and transmit the unique permutation of the media content to the user by selecting segments of the first subset of the first plurality of sequential segments with watermarks and segments of the second subset of the second plurality of sequential segments with watermarks in sequence according to the map.

In another exemplary implementation, a method is implemented on a computer system for dynamically watermarking streaming media. One or more processors in the computer system is particularly configured to perform a number of processing steps including the following: receiving a user request for media content from a user; determining an identity of the user; watermarking the media content by selecting a first plurality of watermarked segments from a first stored watermarked copy of the media content and a second plurality of watermarked segments from a second stored watermarked copy of the media content; associating the watermarked media content with the user; and storing the association of the watermarked media content with the user These watermarking process further results in the first and second stored watermarked copies having the following attributes: a quantity of all segments in the second stored watermarked copy corresponds to a quantity of all segments in the first stored watermarked copy; all segments in the first stored watermarked copy have respective segment lengths and are arranged in a sequence; all segments in the second stored watermarked copy each have respective segment lengths which are identical in length to the respective segment lengths of the first stored watermarked copy and are arranged in an identical sequence; and the first plurality of segments and the second plurality of segments are selected to interlace together in the identical sequence.

In a further exemplary implementation, a non-transitory computer readable storage medium contains instructions for instantiating a special purpose computer having a processor and a memory to dynamically watermark streaming media. The instructions configure the processor to implement a computer process comprising the following operations: generating a first copy of a media content; dividing the first copy of the media content into a first plurality of portions arranged in a sequence, wherein each of the first plurality of portions has a respective length; watermarking the first plurality of portions of the first copy; generating a second copy of the media content; dividing the second copy of the media content into a second plurality of portions arranged in the sequence, wherein a quantity of the second plurality of portions is equal to a quantity of the first plurality of portions and each portion of the second plurality of portions has a respective length which is identical in length to a respective length of a corresponding one of the first plurality of portions; watermarking a plurality of portions of the second copy; and interlacing a watermarked subset of the first plurality of portions and a watermarked subset of the second plurality of portions to combine in the sequence and thereby generate a unique deliverable permutation of the media content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1:
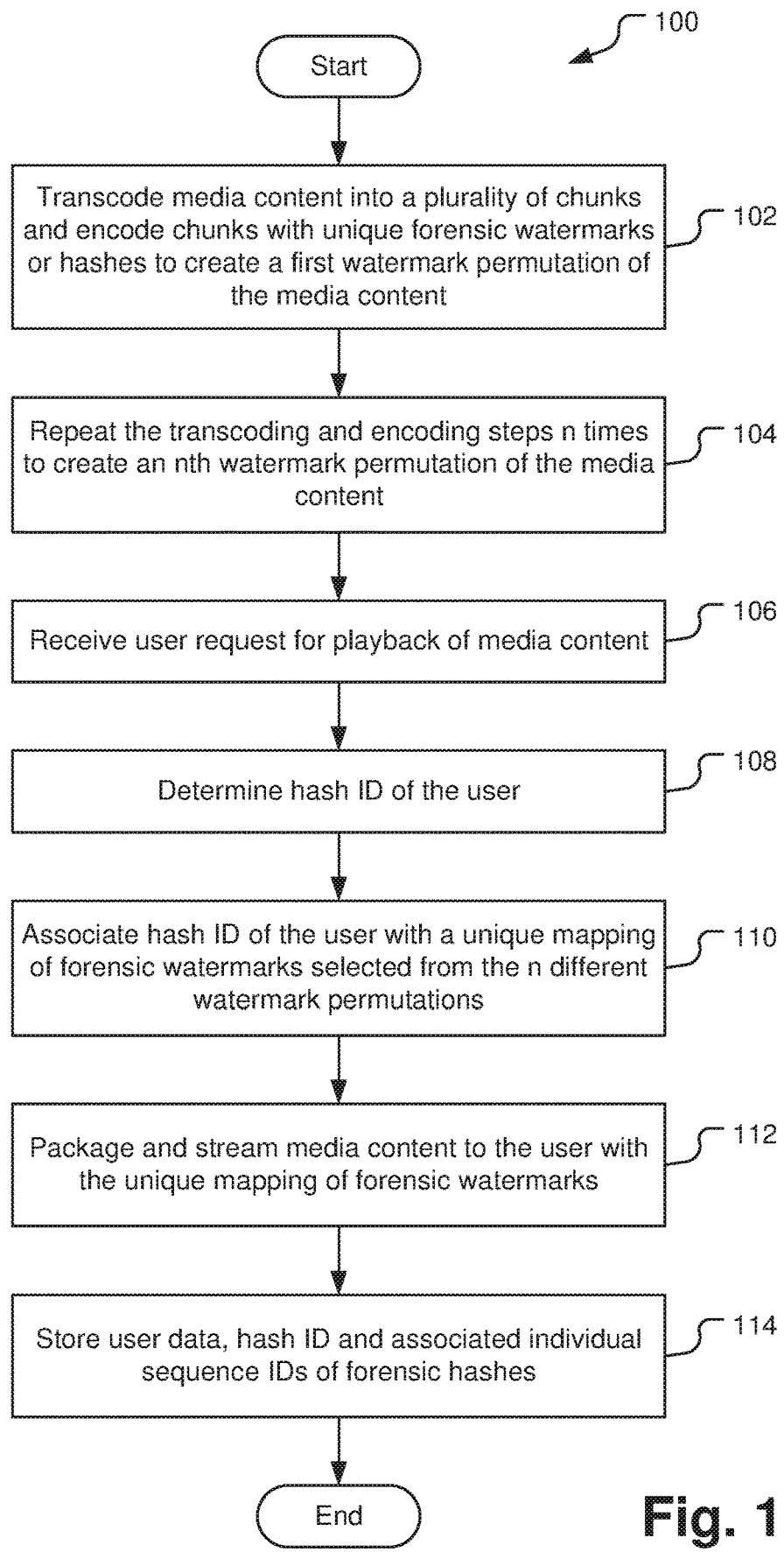
FIG. 1 is a flow diagram illustrating a method of watermarking streaming multimedia content upon user request.

This disclosure relates to dynamically watermarking streaming multimedia content at the point of transmission. In several embodiments, multimedia content, such as film or video, is streamed to a plurality of users with a unique watermark embedded for each user. In many embodiments, the content is provided through asynchronous multicast transmission. In these embodiments, users may request the content at different times and receive a uniquely watermarked stream of the content upon request. In most embodiments, content is watermarked upon a request for the content by a user. In several embodiments, each user is associated with a unique ID that becomes associated with a unique watermark. Once a watermark is associated with a user, the association is stored so that the same unique watermark may be used for future content requested by the user. This allows a plurality of content to be traced back to a single user based upon a signature watermark.

In several embodiments, two or more copies of a media file are created, each with a unique sequence of a plurality of distinctly watermarked segments. These segmented, sequenced watermarked copies may be generated and stored in a database. Each distinct watermarked segment in the sequenced watermarked copies may be partitioned from the media file, for example, as specific time interval segments between chunked file boundaries (e.g., as used with adaptive bitrate streaming protocols) or between each group of pictures (GOP) or other encoding boundaries in the media files. In some cases of streaming or downloading, transport packets may include one or more distinct watermark segments depending upon the number of GOPs per time interval packet. Upon a user request for the multimedia content, a unique combination of distinct watermarked segments from each sequenced watermarked copy of the media file may be mixed together to create a unique permutation of watermarked media content streamed or downloaded to the user. Upon a different user request for the multimedia content, a different combination of distinct watermarked segments from each sequenced watermarked copy of the media file may be mixed together to create another different unique permutation of watermarked media content streamed or downloaded to the different user. A typical media file (e.g., a feature film) may be segmented into thousands of distinct watermark segments. For a number k of sequenced watermarked media files, each with a number n of distinct watermarked segments, k^n different permutations of the watermarked media content can be created. Even if only two sequenced watermarked copies are used, where n is 100, 2^n distinct permutations of watermarked media content may be created, which numbers over $1 \times 10^{30}$. Thus, many millions of unique users may be accommodated as many millions of unique permutations of watermarked media content are possible. This allows for unique watermarking of streaming media content upon user request on a large scale.

A minimum of two sequenced watermarked copies with distinct watermarked segments may be used, and a maximum may be determined by the length of the multimedia file, the length and number of partitions or chunks of distinct watermarked segments per file, and the upper limit on a number of users that need to view unique copies. For example, for a typical two hour feature film with 5 second chunks of distinct watermarked segments, two sequenced watermarked files can address over a million users with a high enough level of differentiation across users to be able to identify a unique user even with some level of file modification (such as trimming credits off the end of the file).

Turning now to the figures, a method of the present disclosure will be discussed in more detail. FIG. 1 is a flow chart illustrating a method of watermarking streaming multimedia content upon a user request. The method 100 begins with operation 102 and media content may be transcoded into a plurality of t segments. Numerous methods for dividing media content into segments are contemplated. As an example, the media content may be divided based on GOPs or frame numbers. For example, a new segment may be created every 5 seconds, every 3 GOPs, or every 50 frames, or in any other time or frame division. The segments may then be encoded with unique forensic watermarks to create a first combination of watermarked segments for the media content. In one embodiment, each segment may be encoded with a unique forensic watermark. In another embodiment, some of the segments may be encoded with unique forensic watermarks, while some segments may not be encoded. It is contemplated that conventional watermarking techniques may be used. For example, a forensic mark may be applied to visual media, such as images or video, or a marker may be embedded in a signal, such as an audio or video signal. The mark is forensic and may be embedded in each segment so as to be able to map it back to a unique sequenced combination of segments. Many different watermarks are contemplated. For example, the mark may be overlaying images, logos, messages, or code embedded into the media. It is contemplated that any visual watermark embedded cannot be removed programmatically or defeated. The string or combination of unique forensic watermarks created for sequential segments may make up the first sequenced watermarked media file.

After operation 102, the method 100 proceeds to operation 104 and the media content may be again transcoded into a plurality of segments at the same boundaries as the segments in the first sequenced watermarked media file. However, the segments may be encoded with a combination of different, unique forensic watermarks to create a second sequenced watermarked media file. It is contemplated that at least one of the plurality of watermarked segments of media content is different than the plurality of watermarked segments created at operation 102. Regardless, the combination of watermarked segments in the second sequenced watermarked media file is different than the combination of watermarked segments in the first sequenced watermarked media file. Each sequenced watermarked media file has a unique sequence of forensic watermarks. It is contemplated that operation 104 may be repeated any number of times, n, to produce any number of different sequenced watermarked media files for the same media content, each with unique sequences of segments that are forensically watermarked, but partitioned at the same time interval, GOP, or other boundary between groups of frames.

After operation 104, the method 100 proceeds to operation 106 and a user request for playback of the media content may be received. As an example, a user may connect to an over-the-top ("OTT") portal to stream content over the internet. For example, a user may wish to stream a copyrighted TV show or movie on Netflix, Hulu, YouTube, or other OTT portal. As another example, a film producer, director, or other creative executive may wish to stream pre-release footage of a film to monitor its progress and identify any issues during production. It is contemplated that there may be multiple users requesting playback of the same media content (e.g., the same TV show, movie, or pre-release footage) at the same or at different times.

In one embodiment, the user may connect to an edge interface of the network to request playback. In this embodiment, data processing, including encoding and watermarking the media for streaming, may occur at the edge interface of the network, which is located near the source of the data. An advantage to using edge computing is to decrease the distance the data must travel, reducing transmission costs. Another advantage to dynamically watermarking content at the edge interface is optimization of storage space by eliminating the need to store multiple watermarked copies in advance within the core computing environment. This further allows for greater scalability, as limited storage space typically limits the number of watermarked copies available. It is contemplated that playback may be in a format capable of transport-agnostic delivery and is not limited to current transport encapsulation technologies.

After operation 106, the method 100 proceeds to operation 108 and the hash ID of the user may be determined. As one example, the user may need to log in to the OTT portal to access the streaming content. When the user accesses the portal or logs in, an encrypted cookie may store a hash ID unique to the particular user as part of the authentication process. The edge interface may decrypt the encrypted cookie to determine the hash ID of the user each time the user accesses or logs in to the OTT portal. Each user may be associated with a unique hash ID. As another example, a single user may be associated with a new, unique hash ID every time they request content. In this case, user-side metrics, such as source IP address, user agent, and the like, may be tracked and associated with the unique hash ID and used to identify unauthorized sharing of valid authentication credentials and specific playback locations or devices that may be sources of illegal leaks of the content.

After operation 108, the method 100 proceeds to operation 110 and the hash ID of the user may be associated with a unique mapping of forensic watermarks selected from n different sequenced watermarked media files created at operations 102 and 104. For example, the edge interface may send a request to an origin module to create a unique forensic hash sequence ID to associate with the unique hash ID of the user. The origin is an upstream infrastructure and packaging application(s) responsible for generating unique playback manifests in a secure environment. The forensic hash sequence ID may be understood as a listing of a unique sequence and combination of watermarked segments interpolated between the sequenced, watermarked media files for the user. The forensic hash sequence ID may be associated with the user, and this association may be stored in a database table linked to the hash ID of the user, or, alternatively to a session or playback ID.

The origin module may either generate a new, unique forensic hash sequence ID using one of n stored permutations of the watermarked segments among the sequenced watermarked media files or apply an existing (and stored) associated forensic hash sequence ID to the content requested by the user depending upon the hash ID of the user. For example, the user may be a new user with no associated forensic hash sequence ID or the system may provide a unique forensic hash sequence ID for each request. In this case, the origin may generate a new forensic hash sequence ID by selecting or generating a unique permutation of watermarked segments among the sequenced watermarked media files for the content requested and associate it with the hash ID of the user. In another example, the user may be an existing user with a forensic hash sequence ID already associated with the user's hash ID. In this case, the origin may apply the stored associated forensic hash sequence ID to the content requested by the user.

In several embodiments, a unique mapping of the forensic watermark segments selected from each of the sequenced watermarked media files may create a unique sequence identification of forensic hashes associated with the hash ID of the user. Any random ordering of forensic watermarked segments is contemplated. For example, the mapping may switch back and forth between the forensic watermarked segments from a first sequenced watermarked media file and the forensic watermarked segments from a second sequenced watermarked media file every 5 forensic watermark segments, or it may alternate between the sequenced watermarked media files at random segment boundaries, or in any other possible combination of forensic watermarked segments from the sequenced watermarked media files to create k^n deliverable permutations of the media content. It is contemplated that more than two sequenced watermarked media files may be used for mapping forensic watermarks to create even more possibilities for unique forensic hash sequence IDs with reduced chances of collision, or reduced chances of creating duplicate sequence IDs or running out of unique forensic watermark combinations. For example, five sequenced watermarked media files may be used, creating even more combinations for unique deliverable permutations of the media content. Millions of possible combinations are contemplated to create unique forensic hash sequence IDs for millions of potential users. It is desirable to create a robust sequence of forensic watermarks that remains detectable after any tampering or modifications.

After operation 110, the method 100 proceeds to operation 112 and a deliverable permutation of media content is packaged and streamed or compiled for download to the user with the unique mapping of forensic watermarks. In one embodiment, the deliverable permutation is sequenced and combined from the sequenced watermarked media files in real time as the content is streamed to the user. As one example, as the content is streaming, forensic watermarked segments from first and second sequenced watermarked media files may be selected per the user's forensic hash sequence ID for transmission. The stream is thus a transmission of selected segments of the first and second sequenced watermarked media files in series, where the selected segments are interpolated or interlaced in succession in real time in an order defined by the unique permutation. When streaming of the unique permutation of the media content is complete, the streamed media content contains a unique sequence of forensic watermarked segments selected from the first and second sequenced watermarked media files. In another embodiment, watermarked segments may be chosen from the sequenced watermarked media files at random to form the deliverable permutation of the media content and the random pattern is recorded and associated with a unique forensic watermark sequence ID for the user at the time of transmission.

After operation 112, the method 100 proceeds to operation 114 and user data, the user hash ID, and the individual forensic hash sequence ID of the permutation of the media content associated with the user are stored. User data may include an IP address, the user device profile, session details, provider, time, and the like. By storing the unique forensic hash sequence ID in association with the hash ID of the user, any additional content requested by the user may be associated with the same unique forensic hash sequence ID so that only one unique forensic hash sequence ID corresponding to the permutation of the media content delivered to the user is associated with the user. Such information may be stored in perpetuity on tamper-proof highly durable and encrypted storage so that it can be tracked and used for forensic analysis.

During forensic analysis, the unique sequence of watermarked segments constituting the delivered permutation of the media content or a hash value associated with the sequence of watermarked segments may be used to identify the user associated with the content being investigated. For example, a hash algorithm may be applied to an entire sequence of watermarked segments in a permutation of media content to create a unique hash value or fingerprint for the sequence or permutation. The hash value or fingerprint may be stored in a database and associated with a user (as an alternative to or in addition to storing and associating an entire forensic watermark sequence ID). Using a hash or fingerprint may allow for a quicker comparison of a piece of content to the database to determine an associated user. If the content has been tampered with, then the hash may be different; however, the hash value of the sequence segments of the suspect media file may still be similar enough to narrow the search radius to potentially a single user, depending upon the number of watermarks existing within the sequence.

Figure 2A:
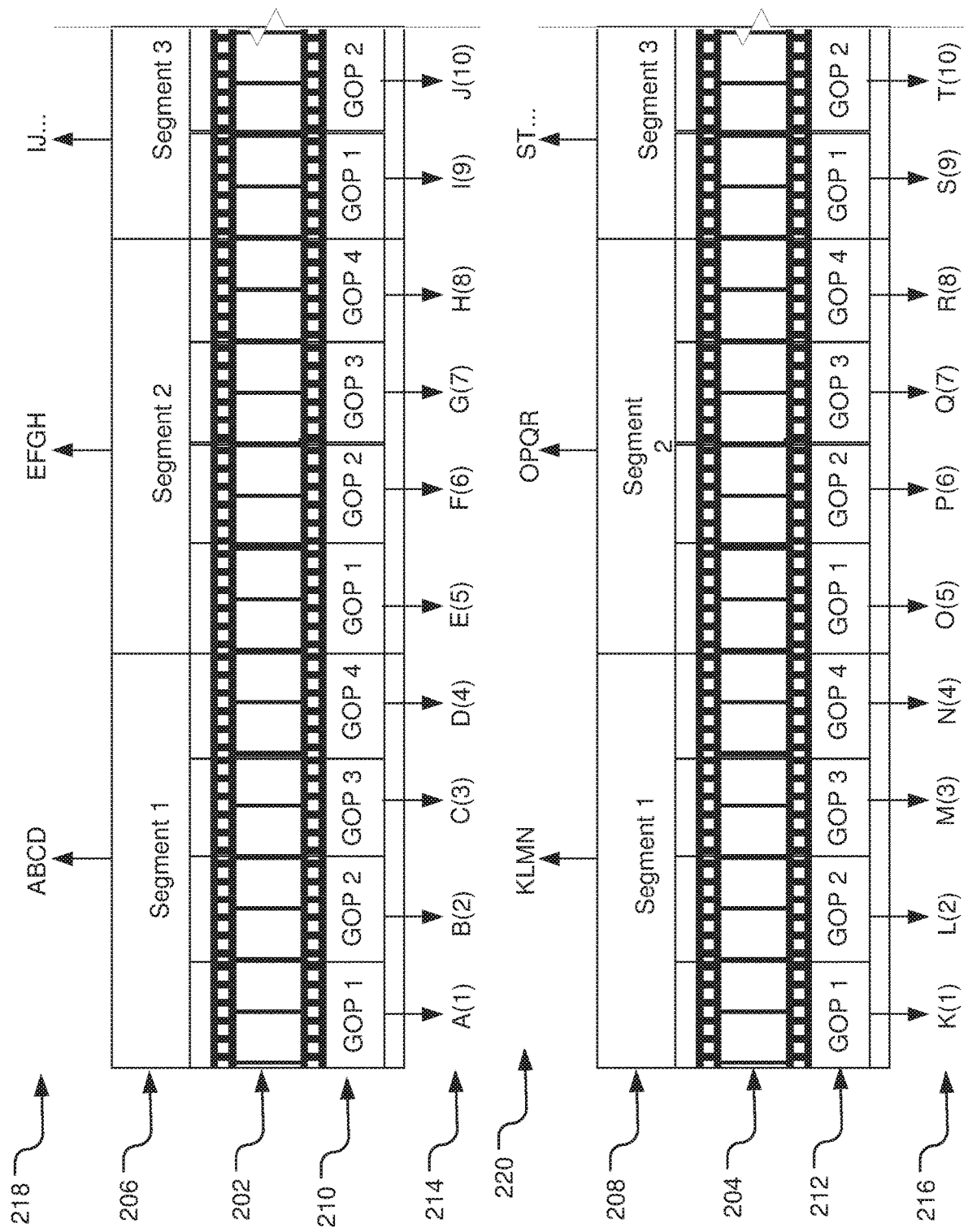
FIG. 2A is a schematic diagram illustrating a method of generating multiple permutations of forensic watermarks from the same media content.

FIG. 2A is a schematic diagram illustrating a method of generating multiple permutations of forensic watermarks from the same media content. In the embodiment shown in FIG. 2A, two sequenced watermarked media files are generated from the same media content; however, it is contemplated that multiple sequenced watermarked media files may be produced from the same media content. For example, if more combinations are needed for more users, as will be discussed in more detail below, then it may be desirable to have more than two sequenced watermarked media files. As shown in FIG. 2A, a first copy 202 of a piece of media content is partitioned a first time into a plurality of segments 206. In the example shown, the media content is divided every eight frames to produce several segments 206. This division is merely exemplary. Any number of segments may be produced depending upon the length of the media content and the method of division. For example, the media content may be divided at any number of frame intervals, or it may be divided based on time code. Also shown in FIG. 2A, the media content is further transcoded into a plurality of GOPs 210. In the example depicted, each GOP 210 contains two frames, although this is merely exemplary, as most GOPs will include substantially more than two frames. It is also contemplated that each GOP may dictate the size of each segment, depending on how the encoder and packager are configured. Any number of GOPs may be produced depending upon the length of the media content and the method of division.

Each segment 206 or GOP 210 may be encoded with a unique forensic watermark 214. For example, GOPs 1-4 of Segment 1 are encoded with forensic watermarks with identifying hash values A, B, C, and D, respectively; GOPs 1-4 of Segment 2 are encoded with identifying hash values E, F, G, H, respectively; and GOPs 1 and 2 of Segment 3 are encoded with identifying hash values I and J, respectively. The numbers (1)-(10) represent the positioning and ordering of the unique watermarks of each segment of the media content. While the hash values of each forensic watermark are represented by the letters A-J in FIG. 2A, an actual forensic hash of a watermark may be a much larger code. For example, the forensic hash of a watermark may include multiple characters and numbers representing a unique code for each segment. When all of the forensic watermarks for each segment are compiled together, they form a unique forensic hash sequence ID. In the example shown in FIG. 2A, the unique sequence of watermarks for a media file copy of the media content may be identified as a hash value A(1)B(2)C(3)D(4)E(5)F(6)G(7)H(8)I(9)J(10) 222. The number of unique watermarks generated in the sequenced watermarked media file may depend upon the length of the media file, the length and number of segments per file, the length and number of GOPs per segment or file, and the upper limit of the number of users that need to view unique copies.

Each individual hash for each segment 206 may be stored. Further, a sequence of watermark hashes 218 may be generated for each segment 206 based on the GOP sequence 210 for each segment and each watermark associated with each GOP 210. As shown in FIG. 2A, Segment 1, containing GOP 1-4, which are associated with watermarks A-D, has a watermark hash sequence of ABCD 218; Segment 2, containing GOP 1-4 associated with watermarks E-H, has a watermark hash sequence of EFGH 218; and Segment 3, which is only partially displayed in the figure, has at least GOP 1 and 2 associated with watermarks I and J, and has a watermark hash sequence starting with IJ 218. Each hash sequence 218 for each segment 206 may also be stored.

In the embodiment shown in FIG. 2A, a second copy 204 of the same piece of media content is transcoded a second time into a plurality of segments 208. In the example shown, the media is again divided every eight frames to produce a plurality of segments 208. This division is again merely exemplary, but the partitioning occurs on the identical frames or boundaries as in the first copy 202 of the media content. The piece of media content is also further transcoded into a plurality of GOPs 212. In this example, each GOP 212 contains two frames, although this is merely exemplary as most GOPs will include substantially more than two frames. Each segment 208 or GOP 212 may be encoded with a unique forensic watermark 216. For example, GOPs 1-4 of Segment 1 are encoded with forensic watermarks K, L, M, and N, respectively; GOPs 1-4 of Segment 2 are encoded with O, P, Q, R, respectively; and GOPs 1 and 2 of Segment 3 are encoded with S and T, respectively. The numbers (1)-(10) represent the positioning and ordering of the unique watermarks of each segment of the media content. While the hash values of each forensic watermark are represented by a letter K-T in FIG. 2A, an actual forensic hash of a watermark may be a much larger code. When all of the forensic watermarks for the segments are compiled together, they form a unique forensic hash sequence ID. In the example shown in FIG. 2A, the unique sequence of watermarks for the second media file copy of the media content may be identified as a hash value K(1)L(2)M(3)N(4)O(5)P(6)Q(7)R(8)S(9)T(10) 224.

Each individual hash for each segment 208 may be stored. Further, a sequence of watermark hashes 220 may be generated for each segment 208 based on the GOP sequence 212 for each segment and each watermark associated with each GOP 212. As shown in FIG. 2A, Segment 1, containing GOP 1-4, which are associated with watermarks K-N, has a watermark hash sequence of KLMN 220; Segment 2, containing GOP 1-4 associated with watermarks O-R, has a watermark hash sequence of OPQR 220; and Segment 3, which is only partially displayed in the figure, has at least GOP 1 and 2 associated with watermarks S and T, and has a watermark hash sequence starting with ST 220. Each hash sequence 220 for each segment 208 may also be stored.

Figure 2B:
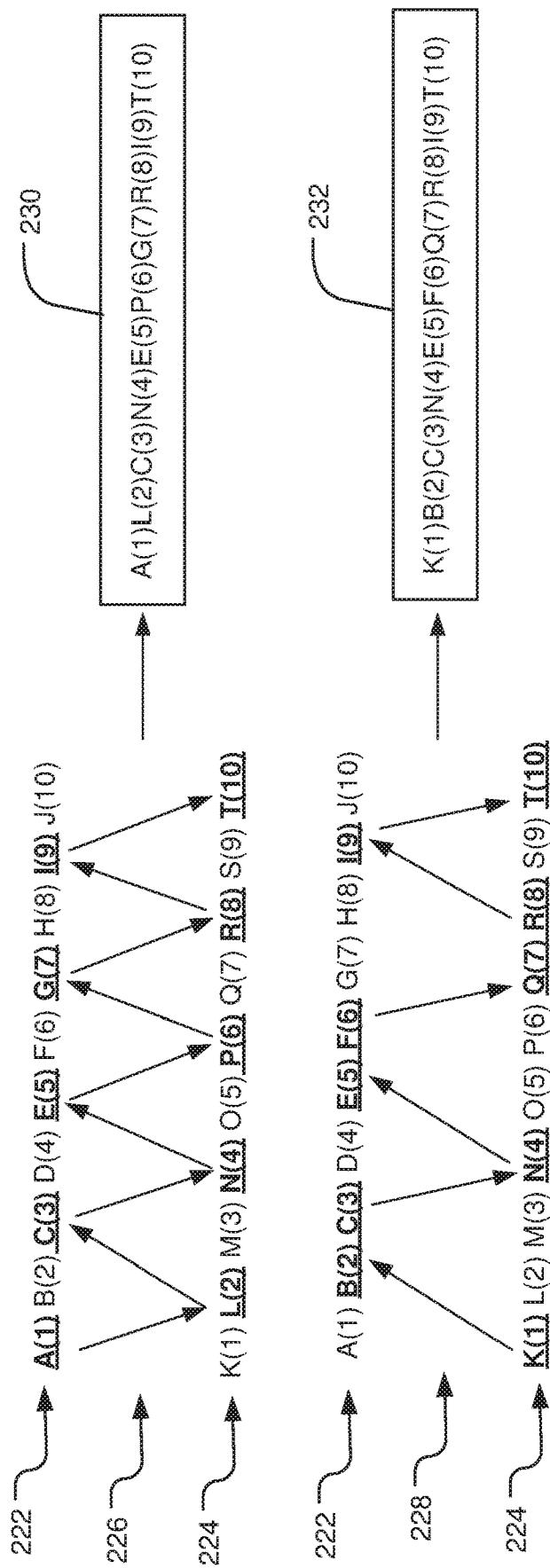
FIG. 2B is a schematic diagram illustrating different ways of mapping forensic watermarks between the permutations of FIG. 2A to produce unique forensic hash sequence IDs.

FIG. 2B is a schematic diagram illustrating different ways of mapping forensic watermarks between the two unique sequenced watermarked media files of FIG. 2A to produce deliverable permutations of the media content with unique forensic hash sequence IDs 230, 232 which may be ascribed to the particular permutation of the media content as an identifier. FIG. 2B shows two different ways of mapping 226, 228 the watermarked segments 222, 224 of the sequenced watermarked media files of FIG. 2A to produce two unique forensic hash sequence IDs 230, 232 for the same media content. In the top example, arrows show mapping 226 alternating between forensic watermarked segments in the first sequenced watermarked media file 222 and forensic watermarked segments in the second sequenced watermarked media file 224. A forensic hash is copied for each of the selected segments (1)-(10). In this top example, the mapping 226 of forensic watermarked segments A-T produces the unique forensic hash sequence ID A(1)L(2)C(3)N(4)E(5)P(6)G(7)R(8)I(9)T(10) 230. In the bottom example, arrows show mapping 228 in a random pattern between the forensic watermarked segments in the first sequenced watermarked media file 222 and forensic watermarked segments in the second sequenced watermarked media file 224 to produce a second unique forensic hash sequence ID K(1)B(2)C(3)N(4)E(5)F(6)Q(7)R(8)I(9)T(10) 232 that is distinct from the forensic hash sequence ID 230 created through the different mapping scheme 226. The two forensic hash sequence IDs 230, 232 may then be combined to form a forensic hash sequence ID assigned to the unique permutation of the media content.

It is contemplated that many mapping schemes, or combinations, are possible, producing multiple unique deliverable permutations of the media content and corresponding forensic hash sequence IDs from the same starting sequenced watermarked media files. The more forensic watermarked segments sequenced watermarked media files that are created, the more mapping schemes are available, the greater the number of unique forensic hash sequence IDs produced, and the lower the risk of collision. This forensic algorithm also provides resilience to tampering, as well as quick lookup and comparison processing for identification of unauthorized copies and the likely user source with the ability to granularly detect tampering at different parts of the file.

Figure 3:
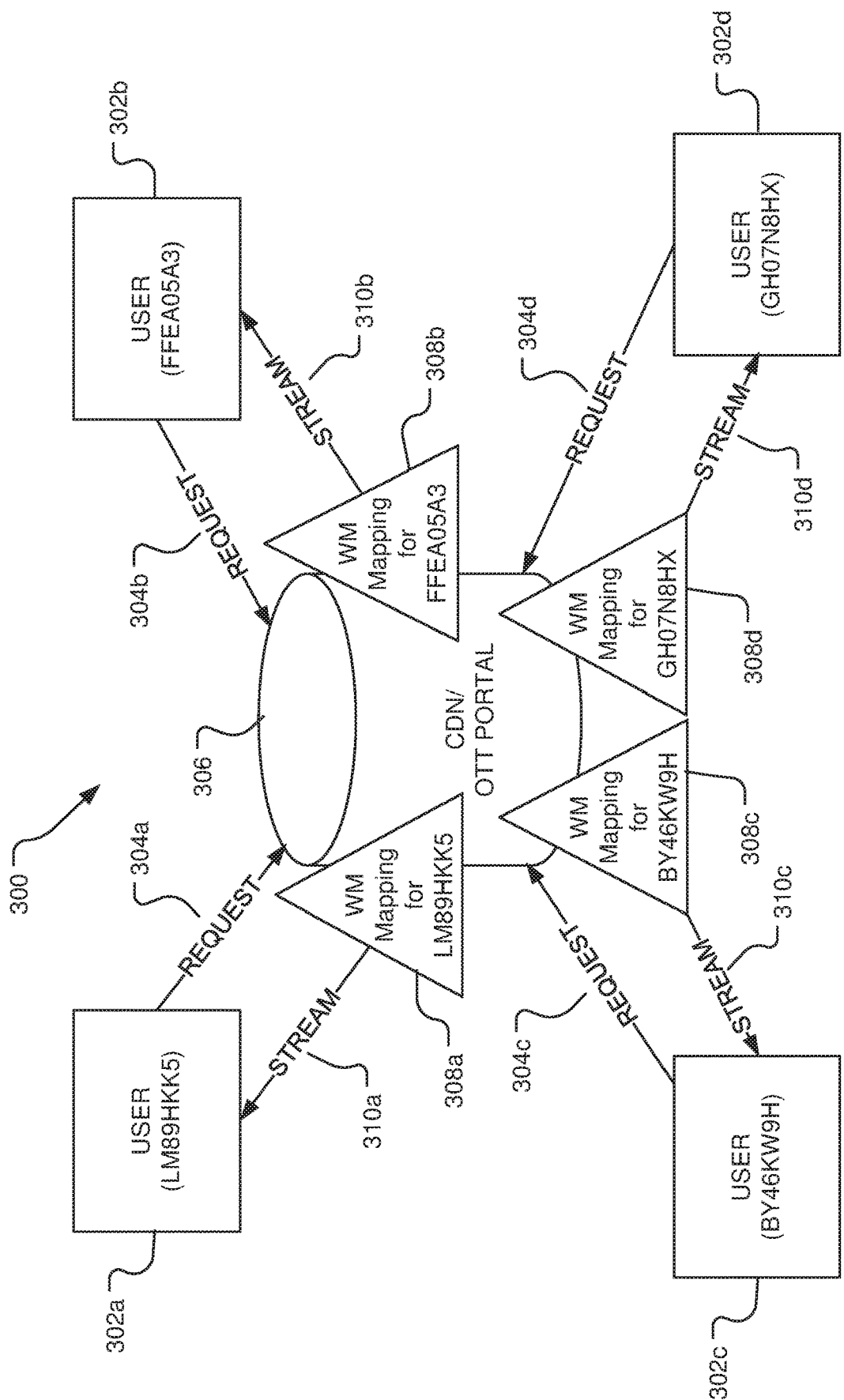
FIG. 3 is a schematic diagram illustrating a system for dynamically watermarking streaming content to a plurality of users.

FIG. 3 is a schematic diagram illustrating a system for dynamically watermarking streaming content to a plurality of users. As shown in FIG. 3, a plurality of users 302a-d may connect with an OTT portal or CDN 306 to request streaming media content. The users 302a-d may each provide the OTT portal 306 with a different request 304a-d for media content. The users 302a-d may request the same content or different content, and they may request the content at the same time or at different times. When a user 302a-d connects to the OTT portal, the portal may associate a hash ID with the user. In the example shown in FIG. 3, the system associates hash ID LM89HKK5 with user 302a, FFEA05A3 with user 302b, BY46KW9H with user 302c, and GH07N8HX with user 302d. Upon user request, the system may generate a unique forensic hash sequence ID associated with each user 302a-d based on a unique watermark (WM) mapping scheme associated with each user hash ID 308a-d. The content may be streamed 310a-d to the user 302a-d as the unique forensic watermarks are mapped. It is also contemplated that the entire unique forensic hash sequence is generated before the unique permutation of the media content is transmitted 310a-d to the user 302a-d.

Figure 4:
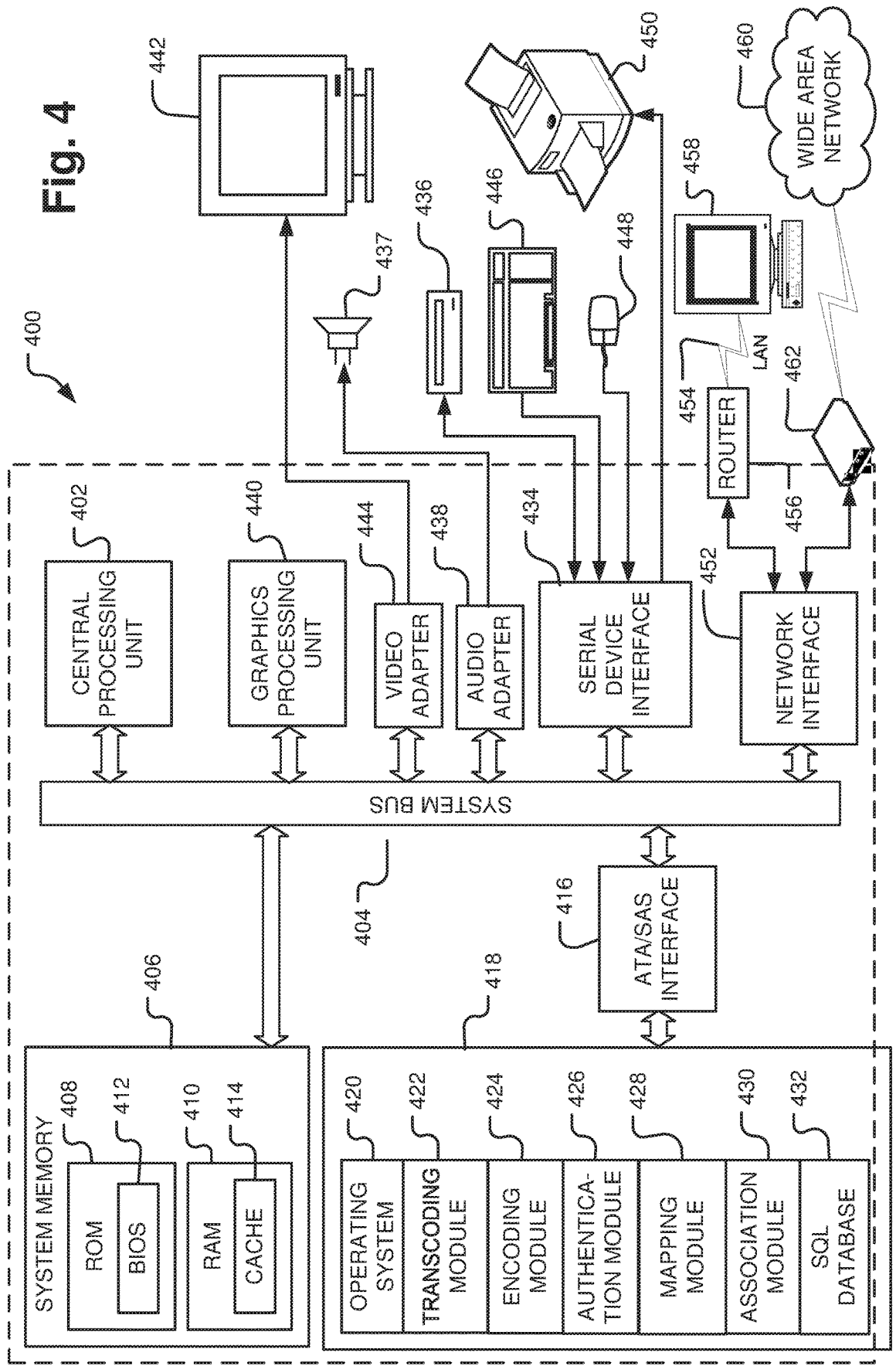
FIG. 4 is a schematic diagram of an exemplary computer system for dynamically watermarking streaming media as described herein.

An exemplary computer-implemented dynamic watermarking system 400 for implementing the dynamic watermarking processes above is depicted in FIG. 4. The dynamic watermarking system 400 may be embodied in a specifically configured, high-performance computing system including a cluster of computing devices in order to provide a desired level of computing power and processing speed. Alternatively, the process described herein could be implemented on a computer server, a mainframe computer, a distributed computer, a personal computer (PC), a workstation connected to a central computer or server, a notebook or portable computer, a tablet PC, a smart phone device, an Internet appliance, or other computer devices, or combinations thereof, with internal processing and memory components as well as interface components for connection with external input, output, storage, network, and other types of peripheral devices. Internal components of the dynamic watermarking system 400 in FIG. 4 are shown within the dashed line and external components are shown outside of the dashed line. Components that may be internal or external are shown straddling the dashed line.

In any embodiment or component of the system described herein, the dynamic watermarking system 400 includes one or more processors 402 and a system memory 406 connected by a system bus 404 that also operatively couples various system components. There may be one or more processors 402, e.g., a single central processing unit (CPU), or a plurality of processing units, commonly referred to as a parallel processing environment (for example, a dual-core, quad-core, or other multi-core processing device). In addition to the CPU, the dynamic watermarking system 400 may also include one or more graphics processing units (GPU) 440. A GPU 440 is specifically designed for rendering video and graphics for output on a monitor. A GPU 440 may also be helpful for handling video processing functions even without outputting an image to a monitor. By using separate processors for system and graphics processing, computers are able to handle video and graphic-intensive applications more efficiently. As noted, the system may link a number of processors together from different machines in a distributed fashion in order to provide the necessary processing power or data storage capacity and access.

The system bus 404 may be any of several types of bus structures including a memory bus or memory controller, a peripheral bus, a switched fabric, point to point connection, and a local bus using any of a variety of bus architectures. The system memory 406 includes read only memory (ROM) 408 and random access memory (RAM) 410. A basic input/output system (BIOS) 412, containing the basic routines that help to transfer information between elements within the computer system 400, such as during start up, is stored in ROM 408. A cache 414 may be set aside in RAM 410 to provide a high speed memory store for frequently accessed data.

A data storage device 418 for nonvolatile storage of applications, files, and data may be connected with the system bus 404 via a device attachment interface 416, e.g., a Small Computer System Interface (SCSI), a Serial Attached SCSI (SAS) interface, or a Serial AT Attachment (SATA) interface, to provide read and write access to the data storage device 418 initiated by other components or applications within the dynamic watermarking system 400. The data storage device 418 may be in the form of a hard disk drive or a solid state memory drive or any other memory system. A number of program modules and other data may be stored on the data storage device 418, including an operating system 420, one or more application programs, and data files. In an exemplary implementation, the data storage device 418 may store a transcoding module 422, an encoding module 424, an authentication module 426, a mapping module 428, an association module 430, as well as the media files being processed and any other programs, functions, filters, and algorithms necessary to implement the dynamic watermarking procedures described herein. The data storage device 418 may also host a database 432 (e.g., a NoSQL database) for storage of video time coding information, watermark coding and parameters, user hash identification, watermark associations, hashing algorithms, media meta data, and other relational data necessary to perform the dynamic watermarking procedures described herein. Note that the data storage device 418 may be either an internal component or an external component of the computer system 400 as indicated by the hard disk drive 418 straddling the dashed line in FIG. 4.

In some configurations, the dynamic watermarking system 400 may include both an internal data storage device 418 and one or more external data storage devices 436, for example, a CD-ROM/DVD drive, a hard disk drive, a solid state memory drive, a magnetic disk drive, a tape storage system, and/or other storage system or devices. The external storage devices 436 may be connected with the system bus 404 via a serial device interface 434, for example, a universal serial bus (USB) interface, a SCSI interface, a SAS interface, a SATA interface, or other wired or wireless connection (e.g., Ethernet, Bluetooth, 802.11, etc.) to provide read and write access to the external storage devices 436 initiated by other components or applications within the dynamic watermarking system 400. The external storage device 436 may accept associated computer readable media to provide input, output, and nonvolatile storage of computer readable instructions, data structures, program modules, and other data for the dynamic watermarking system 400.

A display device 442, e.g., a monitor, a television, or a projector, or other type of presentation device may also be connected to the system bus 404 via an interface, such as a video adapter 440 or video card. Similarly, audio devices, for example, external speakers, headphones, or a microphone (not shown), may be connected to the system bus 404 through an audio card or other audio interface 438 for presenting audio associated with the media files.

In addition to the display device 442 and audio device 447, the dynamic watermarking system 400 may include other peripheral input and output devices, which are often connected to the processor 402 and memory 406 through the serial device interface 444 that is coupled to the system bus 406. Input and output devices may also or alternately be connected with the system bus 404 by other interfaces, for example, a universal serial bus (USB), an IEEE 1494 interface ("Firewire"), a parallel port, or a game port. A user may enter commands and information into the dynamic watermarking system 400 through various input devices including, for example, a keyboard 446 and pointing device 448, for example, a computer mouse. Other input devices (not shown) may include, for example, a joystick, a game pad, a tablet, a touch screen device, a satellite dish, a scanner, a facsimile machine, a microphone, a digital camera, and a digital video camera.

Output devices may include a printer 450. Other output devices (not shown) may include, for example, a plotter, a photocopier, a photo printer, a facsimile machine, and a printing press. In some implementations, several of these input and output devices may be combined into single devices, for example, a printer/scanner/fax/photocopier. It should also be appreciated that other types of computer readable media and associated drives for storing data, for example, magnetic cassettes or flash memory drives, may be accessed by the computer system 400 via the serial port interface 444 (e.g., USB) or similar port interface. In some implementations, an audio device such as a loudspeaker may be connected via the serial device interface 434 rather than through a separate audio interface.

The dynamic watermarking system 400 may operate in a networked environment using logical connections through a network interface 452 coupled with the system bus 404 to communicate with one or more remote devices. The logical connections depicted in FIG. 4 include a local area network (LAN) 454 and a wide area network (WAN) 460. Such networking environments are commonplace in home networks, office networks, enterprise wide computer networks, and intranets. In one implementation, the dynamic watermarking system 400 may be hosted on a cloud platform with scalable and virtualized infrastructure and connected to other systems and users through a WAN 460 such as the internet. These logical connections may be achieved by a communication device coupled to or integral with the dynamic watermarking system 400. As depicted in FIG. 4, the LAN 454 may use a router 456 or hub, either wired or wireless, internal or external, to connect with remote devices, e.g., a remote computer 458, similarly connected on the LAN 454. The remote computer 458 may be another personal computer, a server, a client, a peer device, or other common network node, and typically includes many or all of the elements described above relative to the computer system 400.

To connect with a WAN 460, the dynamic watermarking system 400 typically includes a modem 462 for establishing communications over the WAN 460. Typically the WAN 460 may be the Internet. However, in some instances the WAN 460 may be a large private network spread among multiple locations, or a virtual private network (VPN). The modem 462 may be a telephone modem, a high speed modem (e.g., a digital subscriber line (DSL) modem), a cable modem, or similar type of communications device. The modem 462, which may be internal or external, is connected to the system bus 418 via the network interface 452. In alternate embodiments the modem 462 may be connected via the serial port interface 444. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A computer-implemented dynamic watermarking system comprising
   a storage device configured to ingest and store media content thereon; and
   one or more processors configured with instructions to
      generate a first media file copy of the media content;
      partition the first media file copy into a first plurality of sequential segments each having respective segment lengths defined by respective numbers of groups of pictures;
      encode distinct forensic watermarks into each group of pictures in at least two segments of the first plurality of sequential segments of the first media file copy;
      generate a second media file copy of the media content;

partition the second media file copy into a second plurality of sequential segments corresponding in number to the first plurality of sequential segments and each having respective segment lengths defined by respective numbers of groups of pictures, wherein the segment lengths of each of the second plurality of sequential segments are identical segment lengths to the segment lengths of corresponding segments of the first plurality of sequential segments in sequence;

encode distinct forensic watermarks into each group of pictures in at least two segments of the second plurality of sequential segments of the second media file copy;

store the first and second media file copies on the storage device;

receive a user request for transmission of the media file;

determine an identification of the user;

map a unique permutation of the media content by selecting a first subset of the first plurality of sequential segments with at least one watermark and a second subset of the second plurality of sequential segments with at least one different watermark to be combined in sequence; and transmit the unique permutation of the media content to the user.

2. The system of claim 1, wherein all of the groups of pictures in all of the first plurality of sequential segments of the first media file copy and all of the groups of pictures in all of the second plurality of sequential segments of the second media file copy are encoded with forensic watermarks.

3. The system of claim 1, wherein the first media file copy and second media file copy are each partitioned based on at least one of time code, groups of pictures, and frame numbers.

4. The system of claim 1, wherein a number of media file copies generated is less than a number of users requesting the media content.

5. The system of claim 1, wherein the mapping operation is performed by random selection of sequential segments from each of the first subset and the second subset.

6. The system of claim 1, wherein the mapping operation is based on a unique forensic hash sequence identification associated with the user.

7. The system of claim 1, wherein the one or more processors are further configured to translate the unique permutation to a unique hash value.

8. The system of claim 7, wherein the one or more processors are further configured to associate the unique hash value with the user; and store the association between the unique hash value and the user in the storage device.

9. The system of claim 8, wherein a same unique hash value is used for all content requested by the user.

10. The system of claim 1, wherein the encoding operation occurs at an edge interface of a network associated with the processor.

11. The system of claim 1, wherein a number of unique permutations of the media content increases as one or both of an amount of media file copies and an amount of sequential segments increases.

12. The system of claim 1, wherein the one or more processors are further configured to transmit by asynchronous multicast transmission two or more unique permutations of the media content to two or more respective users.

13. The system of claim 1, wherein the one or more processors are further configured to transmit the segments of the first subset and the segments of the second subset in series in real time in an interlaced order defined by the unique permutation.

14. A method implemented on a computer system for dynamically watermarking streaming media, wherein one or more processors in the computer system is particularly configured to perform a number of processing steps comprising receiving a user request for media content from a user;

determining an identity of the user;

watermarking the media content by selecting a first plurality of forensically watermarked segments from a first stored watermarked copy of the media content and a second plurality of forensically watermarked segments from a second stored watermarked copy of the media content, wherein a quantity of all segments in the second stored watermarked copy corresponds to a quantity of all segments in the first stored watermarked copy;

all segments in the first stored watermarked copy have respective segment lengths and are arranged in a sequence, wherein each segment in the first stored watermarked copy is defined by respective numbers of groups of pictures and each croup of pictures in each segment is encoded with a distinct forensic watermark;

all segments in the second stored watermarked copy each have respective segment lengths which are identical in length to the respective segment lengths of the first stored watermarked copy and are arranged in an identical sequence, wherein each segment in the second stored watermarked copy is defined by respective numbers of groups of pictures and each group of pictures in each segment is encoded with a distinct forensic watermark; and the first plurality of segments and the second plurality of segments are selected to interlace together in the identical sequence;

associating the watermarked media content with the user; and storing the association of the watermarked media content with the user.

15. The method of claim 14, wherein the one or more processors are further configured to stream the watermarked media content to the user.

16. The method of claim 15, further comprising watermarking the media content in real time as the media content is streamed to the user.

17. The method of claim 14, further comprising watermarking the media content at a time of the user request.

18. The method of claim 14, wherein each of the first plurality and the second plurality of watermarked segments from the first stored watermarked copy and the second stored watermarked copy, respectively, has an associated hash value, which are combined to ascribe the watermarked media content a unique forensic hash sequence.

19. The method of claim 18, wherein the unique forensic hash sequence is associated with the user.

20. The method of claim 19, wherein additional media content streamed to the user is watermarked using the same unique forensic hash sequence.

21. A non-transitory computer readable storage medium containing instructions for instantiating a special purpose computer having a processor and a memory to dynamically watermark streaming media, wherein the instructions configure the processor to implement a computer process comprising the following operations:

generating a first copy of a media content;

dividing the first copy of the media content into a first plurality of portions arranged in a sequence, wherein each of the first plurality of portions has a respective length;

forensically watermarking the first plurality of portions of the first copy, wherein each portion in the first copy is defined by respective numbers of groups of pictures and each group of pictures in each portion is encoded with a distinct forensic watermark;

generating a second copy of the media content;

dividing the second copy of the media content into a second plurality of portions arranged in the sequence, wherein
- a quantity of the second plurality of portions is equal to a quantity of the first plurality of portions; and
- each portion of the second plurality of portions has a respective length which is identical in length to a respective length of a corresponding one of the first plurality of portions;

forensically watermarking a plurality of portions of the second copy, wherein each portion in the second copy is defined by respective numbers of groups of pictures and each group of pictures in each portion is encoded with a distinct forensic watermark; and interlacing a watermarked subset of the first plurality of portions and a watermarked subset of the second plurality of portions to combine in the sequence and thereby generate a unique deliverable permutation of the media content.

22. The non-transitory computer readable storage medium of claim 21 containing further instructions for configuring the processor comprising
- associating the unique deliverable permutation of the media content with a user upon receipt of a request for the media content; and
- storing the association of the unique deliverable permutation of the media content with a user.

23. The non-transitory computer readable storage medium of claim 22 containing further instructions for configuring the processor comprising
- translating the unique deliverable permutation of the media content into a unique hash value;
- associating the unique hash value with the user; and
- storing the association between the unique hash value and the user in the memory.

24. The non-transitory computer readable storage medium of claim 23 containing further instructions for configuring the processor comprising forensically watermarking the first and second copies of the media content in real time as the unique deliverable permutation of the media content is streamed to the user.

25. The non-transitory computer readable storage medium of claim 23 containing further instructions for configuring the processor comprising transmitting by asynchronous multicast transmission two or more unique permutations of the media content to two or more respective users.

26. The non-transitory computer readable storage medium of claim 21 containing further instructions for configuring the processor comprising streaming the unique deliverable permutation of the media content to the user.

* * * * *